United States Patent
Miyamoto et al.

(10) Patent No.: US 7,899,563 B2
(45) Date of Patent: Mar. 1, 2011

(54) PROTECTIVE SYSTEM FEEDBACK CONTROL DEVICE

(75) Inventors: Noboru Miyamoto, Tokyo (JP); Koichi Ushijima, Fukuoka (JP)

(73) Assignee: Mitsubishi Electric Corporation, Tokyo (JP)

( * ) Notice: Subject to any disclaimer, the term of this patent is extended or adjusted under 35 U.S.C. 154(b) by 287 days.

(21) Appl. No.: 12/170,788

(22) Filed: Jul. 10, 2008

(65) Prior Publication Data

US 2009/0149970 A1 Jun. 11, 2009

(30) Foreign Application Priority Data

Dec. 11, 2007 (JP) .................................. 2007-319793

(51) Int. Cl.
*G05B 9/02* (2006.01)

(52) U.S. Cl. ............................... 700/79; 701/42; 701/43

(58) Field of Classification Search ............... 700/42–46, 700/72, 79; 318/632; 701/41, 42, 43; 180/6.2, 180/404, 422, 443, 446
See application file for complete search history.

(56) References Cited

U.S. PATENT DOCUMENTS

| | | | | |
|---|---|---|---|---|
| 4,374,422 A | * | 2/1983 | O'Keefe et al. .................. 701/93 |
| 4,562,896 A | * | 1/1986 | Morishita et al. ............. 180/422 |
| 4,787,469 A | * | 11/1988 | Yoshida et al. ............... 180/422 |
| 4,940,107 A | * | 7/1990 | Hanisko ......................... 180/446 |
| 4,999,557 A | * | 3/1991 | Inoue ............................. 318/609 |
| 5,267,160 A | * | 11/1993 | Ito et al. .......................... 701/42 |
| 5,420,490 A | * | 5/1995 | Jeon ............................... 318/632 |
| 6,112,846 A | * | 9/2000 | Mukai et al. .................. 180/446 |
| 6,332,506 B1 | * | 12/2001 | Kifuku .......................... 180/443 |
| 6,397,969 B1 | * | 6/2002 | Kasai et al. .................... 180/404 |
| 6,424,873 B1 | * | 7/2002 | Przybylski ...................... 700/42 |
| 6,487,458 B1 | * | 11/2002 | Trapasso ........................ 700/28 |
| 6,604,357 B2 | * | 8/2003 | Bradley et al. .................. 60/276 |
| 7,634,340 B2 | * | 12/2009 | Katrak et al. .................... 701/42 |
| 2002/0029560 A1 | * | 3/2002 | Bradley et al. .................. 60/276 |
| 2004/0083717 A1 | * | 5/2004 | Zhu et al. ......................... 60/284 |
| 2008/0154462 A1 | * | 6/2008 | Yamamoto ...................... 701/41 |

FOREIGN PATENT DOCUMENTS

| | | |
|---|---|---|
| JP | 7-315239 | 12/1995 |
| JP | 8-142886 | 6/1996 |
| JP | 2000-108916 | 4/2000 |
| JP | 2000-333488 | 11/2000 |
| JP | 2002-46636 | 2/2002 |
| JP | 2002-120744 | 4/2002 |
| JP | 2006-36038 | 2/2006 |
| JP | 2006-62515 | 3/2006 |

* cited by examiner

*Primary Examiner* — Albert Decady
*Assistant Examiner* — Dave Robertson
(74) *Attorney, Agent, or Firm* — Oblon, Spivak, McClelland, Maier & Neustadt, L.L.P.

(57) ABSTRACT

A system control device includes a protective control section for providing protective control while allowing a first control command value computation section to perform computations during a period during which a first feedback control section exercises control; a control command value decrease section; a termination time acquisition section for acquiring the information about the termination time for the protective control; and a termination control section which uses a control command value decreased by the control command value decrease section as the initial control command value after the termination time.

5 Claims, 8 Drawing Sheets

PROTECTIVE SYSTEM FEEDBACK CONTROL DEVICE

BACKGROUND OF THE INVENTION

1. Field of the Invention

The present invention relates to a system control device having a self-protection function, and more particularly to a system control device that is capable of steadily maintaining a controlled state.

2. Background Art

In general, a system control device containing a power semiconductor or the like provides feedback control. More specifically, such a system control device exercises control in accordance with a control command value that is defined to reduce the deviation between an actual control value and a target control value, which is to be attained by the system control device. The control command value, which is to be determined for feedback control, generally contains an integral term. A booster device and an electric power steering device are disclosed, for instance, in JP-A-2006-62515 as a system control device that provides feedback control.

Further, the system control device generally incorporates a self-protection function for the purpose of protecting itself, for instance, against short-circuiting, temperature extremes, and high voltage. The self-protection function is exercised to provide self-protective control by temporarily stopping a control operation or by providing control at an output level lower than a target control value. As regards the booster device and electric power steering device disclosed in JP-A-2006-62515, a soft start configuration for inhibiting an output voltage overshoot at the beginning of control is described as the self-protection function.

A system control device that incorporates a self-protection function and provides feedback control can operate in accordance with a target control value or a control value close to the target control value. Further, such a system control device can prevent itself from being adversely affected by exercising the self-protection function to stop itself or operate at a low output level. However, there is the following problem with a system control device that incorporates both feedback control and self-protection functions. More specifically, there is a great discrepancy between a target control value and an actual control value during a self-protection period. Therefore, the integral term targeted for feedback has an undue value. If the integral term is excessive during the self-protection period, the control command value is computed in accordance with the excessive integral term when a self-protection process is terminated to exercise control again in accordance with the target control value. Consequently, feedback control is exercised through the use of an undue control command value that is greater than the control command value required to attain the target control value. This causes a problem such an overshoot in which voltage or current is excessive.

SUMMARY OF THE INVENTION

The present invention has been made to solve the above problem. An object of the present invention is to provide a system control device that is capable of inhibiting a control value overshoot when it resumes control in accordance with a target control value after terminating its self-protection process.

According to one aspect of the present invention, a system control device includes a semiconductor element, actual control value acquisition means for acquiring the information about an actual control value of the semiconductor element, deviation computation means for computing the deviation between the actual control value and a target control value, integral term computation means for computing an integral term contained in a control command value, first control command value computation means for determining a first control command value, which is the next control command value, from the immediately preceding integral term and the deviation, first feedback control means for exercising feedback control over the semiconductor element in accordance with the first control command value, protective control means for providing protective control by temporarily halting the semiconductor element or by exercising control at an output level lower than the target control value while allowing the first control command value computation means to perform computations during a period during which the first feedback control means exercises control, control command value decrease means for decreasing the control command value, termination time acquisition means for acquiring the information about the termination time for the protective control, and termination control means which uses a control command value that is rendered smaller, by the control command value decrease means, than the first control command value computed by the first control command value computation means for the first time after the termination time, as the initial control command value after the termination time and in place of the first control command value.

According to another aspect of the present invention, a system control device includes a semiconductor element, actual control value acquisition means for acquiring the information about an actual control value of the semiconductor element, deviation computation means for computing the deviation between the actual control value and a target control value, integral term computation means for computing an integral term in a control command value, first control command value computation means for determining a first control command value, which is the next control command value, from the integral term of the immediately preceding control command value and the deviation, first feedback control means for exercising feedback control over the semiconductor element in accordance with the first control command value, protective control means for providing protective control by temporarily halting the semiconductor element or by exercising control at an output level lower than the target control value while allowing the first control command value computation means to perform computations during a period during which the first feedback control means exercises control, integral decrease means for decreasing the integral term, and protected integral value decrease means for causing the integral decrease means to decrease the integral term over which the protective control is provided.

According to another aspect of the present invention, a system control device includes a semiconductor element, actual control value acquisition means for acquiring the information about an actual control value of the semiconductor element, deviation computation means for computing the deviation between the actual control value and a target control value, integral term computation means for computing an integral term contained in a control command value, first control command value computation means for determining a first control command value, which is the next control command value, from the integral term of the immediately preceding control command value and the deviation, first feedback control means for exercising feedback control over the semiconductor element in accordance with the first control command value, protective control means for providing protective control by temporarily halting the semiconductor element or by exercising control at an output level lower than the target control value while allowing the first control command value computation means to perform computations during a period during which the first feedback control means exercises control, control command value decrease means for decreasing the control command value, target control value simulation means for equalizing the target control value with the actual control value over which the protective control is exercised, and protected target control value simulation means which uses the target control value simulation means while the protective control is exercised.

Other and further objects, features and advantages of the invention will appear more fully from the following description.

DETAILED DESCRIPTION OF THE PREFERRED EMBODIMENTS

First Embodiment

Figure 1:
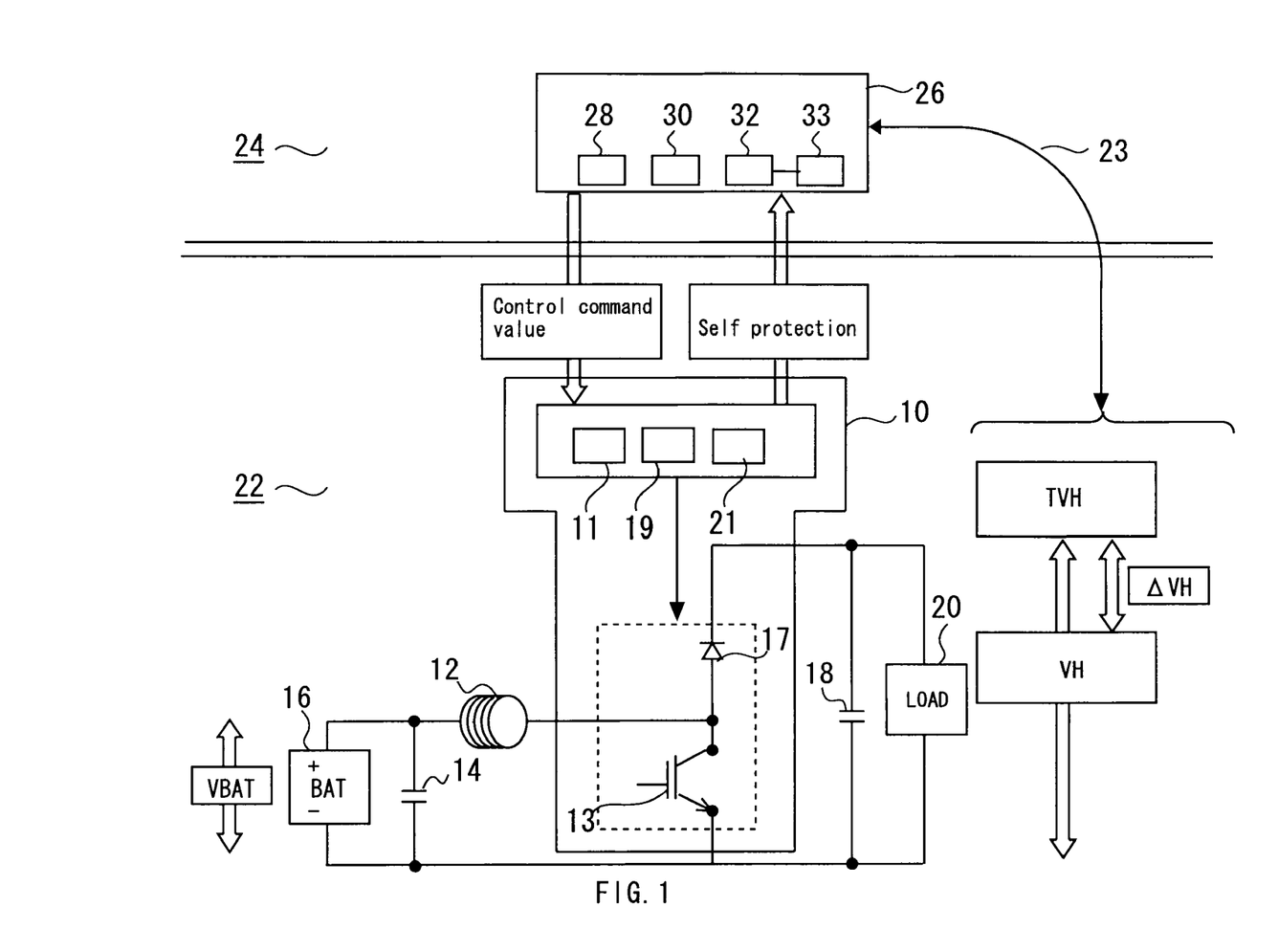
FIG. 1 is a block diagram illustrating the configuration of the first embodiment.

A first embodiment of the present invention will now be described. The first embodiment relates to a system control device that inhibits a control value overshoot when control is resumed after a temporary halt. FIG. 1 is a block diagram illustrating the configuration of the present embodiment. The system control device according to the present embodiment includes a high-order system 24 and a low-order system 22. In the present embodiment, the low-order system 22 is a booster system. First of all, the configuration of the low-order system 22 will be described. The low-order system 22 includes a battery 16. In FIG. 1, a voltage sensor value for the battery 16 is designated as VBAT. A primary smoothing capacitor 14 is positioned subsequently to the battery 16. The primary smoothing capacitor 14 is connected in parallel with a circuit. The primary smoothing capacitor 14 smoothes a signal. A reactor 12 is positioned subsequently to the primary smoothing capacitor 14 and connected in series with the circuit.

A booster semiconductor device 10 is positioned subsequently to the reactor 12. The booster semiconductor device 10 controls a boosting process that is performed by the low-order system 22. The booster semiconductor device 10 receives a control command value from the high-order system 24, which will be described later, and provides boosting in accordance the received control command value. The booster semiconductor device 10 includes a diode 17 for rectification. The booster semiconductor device 10 also includes a power device (IGBT) 13 that is PWM-signal-controlled in accordance with the above-mentioned control command value. In addition, the booster semiconductor device 10 incorporates a self-protection function that halts its operation for a predetermined period of time when the low-order system 22 is overloaded due, for instance, to an overcurrent or applied heat. The aforementioned self-protection function is exercised by a self-protective control section 11 that is included in the booster semiconductor device 10. Further, the booster semiconductor device 10 includes a self-recovery control section 19 that provides boosting (control) again in accordance with the control command value after the operation of the booster semiconductor device 10 is halted for the predetermined period of time by the self-protective control section 11.

Moreover, the booster semiconductor device 10 according to the present embodiment includes a self-protection notification section 21, which notifies the high-order system 24 that self-protection is provided by the self-protective control section 11. During a self-protection period, the self-protection notification section 21 uses, for instance, a Hi/Low signal to notify that self-protective control is being exercised.

A secondary smoothing capacitor 18 is positioned subsequently to the booster semiconductor device 10 and connected in parallel with the circuit. A load 20 is connected subsequently to the secondary smoothing capacitor 18. For example, a motor may be used as the load 20. The load 20 is provided with a sensor that detects a boosted voltage sensor value VH. The difference (deviation) between the value VH and a target voltage value TVH is ΔVH.

The high-order system 24 includes a high-order control system 26. The high-order control system 26 mainly computes the control command value to be supplied to the low-order system 22 and transmits the computed control command value to the low-order system 22. The high-order control system 26 includes a feedforward computation section 28, a feedback computation section 30, an excessive control inhibition section 32, and a target voltage value computation section. The feedforward computation section 28 reads the aforementioned voltage sensor value VBAT for the battery 16 and the boosted voltage sensor value VH. From the values VBAT and VH, the feedforward computation section 28 computes the feedforward term of the control command value to be transmitted to the booster semiconductor device 10.

The feedback computation section 30 acquires the boosted voltage sensor value VH, which represents an actual voltage boosted by the low-order system 22. This is indicated by a bidirectional arrow 23 in FIG. 1. Next, a deviation computation section (not shown) computes the deviation ΔVH between the actual boosted voltage and target voltage. Equation 1 below is used to compute a feedback term in accordance with the value ΔVH:

Feedback control value=$Kp \times \Delta VH + Ki \times \Sigma \Delta VH$

Equation 1 where Kp is a proportionality constant and Ki is an integration constant. The first term ($Kp \times \Delta VH$) of Equation 1 is referred to as a proportional term. The second term ($Ki \times \Sigma \Delta VH$) is referred to as an integral term. As described above, the feedback term according to the present embodiment is given as the sum of the proportional term and integral term. The sum of the feedback term and feedforward term is then transmitted to the low-order system 22 as a control command value.

Figure 2:
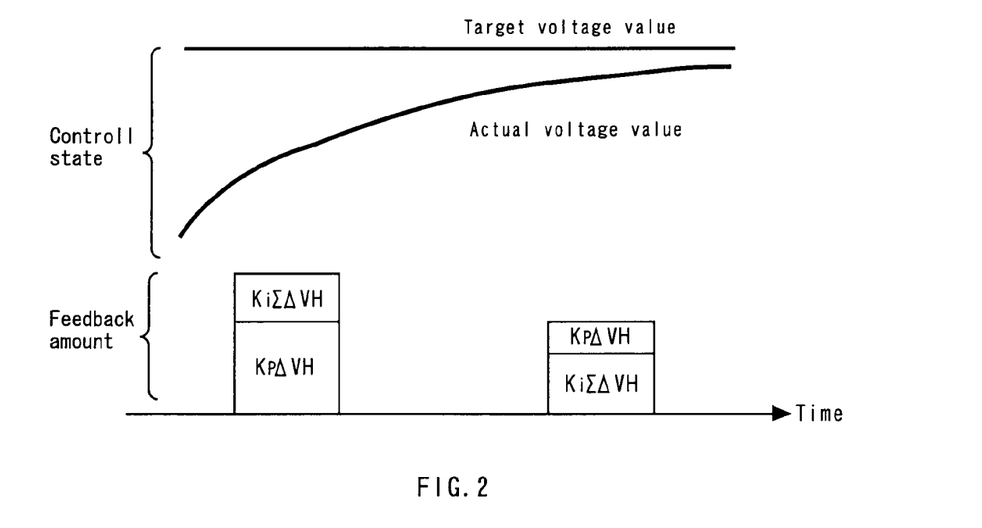
FIG. 2 shows the target voltage value and typical changes in the actual voltage value.

Feedback control that is provided by the present embodiment will now be described with reference to FIG. 2. In FIG. 2, the horizontal axis indicates time. For explanation purposes, it is assumed that the target voltage value is constant. A graph in FIG. 2 shows the target voltage value and typical changes in the actual voltage value. A bar chart below the graph indicates the feedback term (feedback amount) that relates to a particular position within the graph. As is obvious from FIG. 2, the value of the feedback term is great when there is a great discrepancy between the actual control value and target voltage value (see the left-hand side of FIG. 2). The reason is that the currently used control command value causes the actual control value to be considerably smaller than the target control value and that a greater control command value is transmitted to reduce the discrepancy between the actual control value and target control value. In a region (see the right-hand side of FIG. 2) where there is a small discrepancy between the actual control value and target control value, the value of the feedback term is small because the currently used control command value is substantially the same as the target control value.

As described earlier, the feedback term includes the proportional term, which corrects the transient deviation between the actual voltage value and target voltage value, and the integral term, which corrects the stationary deviation between the actual voltage value and target voltage value. When there is a great deviation between the target voltage value and actual voltage value, the feedback term is mainly determined by the proportional term (the proportional term is predominant over the integral term) because the proportional term and integral term are as described above. On the other hand, when there is a small deviation between the target voltage value and actual voltage value, the feedback term is mainly determined by the integral term (the integral term is predominant over the proportional term). As described above, the present embodiment exercises feedforward control and feedback control to determine the control command value to ensure that the actual voltage value agrees with the target voltage value as indicated in FIG. 2.

The excessive control inhibition section 32 will now be described. The excessive control inhibition section 32 receives a notification that self-protection is provided for the booster semiconductor device 10. A storage device 33 is connected to the excessive control inhibition section 32. The storage device 33 stores an integral term that prevailed before the start of self-protection (this integral term is hereinafter referred to as the pre-start integral term) (details will be given later). The excessive control inhibition section 32 generates a first control command value after termination of self-protection. The excessive control inhibition section 32 uses the pre-start integral term to compute a control command value for the integral term that is used as the first control command value after termination of self-protection. The excessive control inhibition section 32 and storage device 33 are used to determine the first control command value after termination of self-protection and constitute a characteristic part of the present invention.

The high-order control system 26, which includes the feedforward computation section 28, feedback computation section 30, excessive control inhibition section 32, and storage device 33, includes a microcomputer and a memory device that implement the functionality described above. The present embodiment is configured as described above. The high-order control system 26 computes a control command value to attain a target control value (target voltage value) in accordance, for instance, with the deviation $\Delta VH$, and issues an instruction to the low-order system. Then, the high-order control system 26 computes the value $\Delta VH$ again, computes a new control command value, and issues an instruction. Further, the system control device according to the present embodiment can cause the self-protective control section 11 to halt the system control device's operation for a predetermined period of time for element protection purposes. The first control command value after termination of self-protection is generated by the excessive control inhibition section 32 and transmitted to the booster semiconductor device 10. In the present embodiment, the high-order control system 26 continues to operate while self-protection is provided. More specifically, the proportional term, integral term, and feedforward term are continuously computed during a self-protection period. The value $\Delta VH$ and other variables prevailing during the self-protection period are used as the data for such computation.

Figure 3:
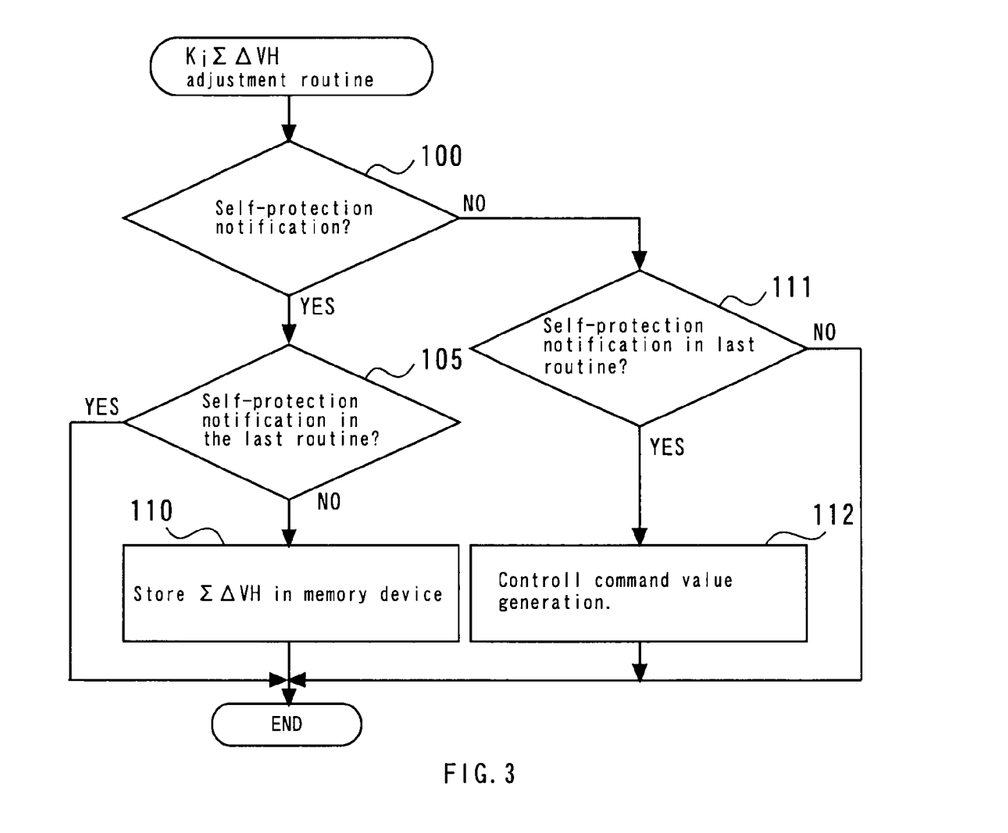
FIG. 3 is a flowchart illustrating a method that the first embodiment uses to compute the integral term.

FIG. 3 is a flowchart illustrating a method that the present embodiment uses to compute the integral term. The subsequent description will be given with reference to FIG. 3. First of all, step 100 is performed to judge whether the high-order control system 26 has received a self-protection notification, which notifies that self-protection is provided, from the self-protection notification section 21. After the self-protection notification is received, step 105 is performed to judge whether a self-protection notification was received in the last (immediately preceding) routine. If a self-protection notification was received in the last routine, the current routine immediately terminates. If, on the other hand, no self-protection notification was received in the last routine, processing proceeds to step 110. In step 110, the storage device 33 stores the integral term ($\Sigma \Delta VH$). The integral term stored in step 110 is the latest integral term prevailing when processing proceeds to step 110. This integral term is the aforementioned pre-start integral term. When the storage device 33 stores the pre-start integral term in step 110, the routine terminates.

On the other hand, if the judgment result obtained in step 100 does not indicate that the self-protection notification is received from the self-protection notification section 21, processing proceeds to step 111. Step 111 is performed to judge whether the high-order control system 26 received a self-protection notification in the last (immediately preceding) routine. If the judgment result obtained in step 111 indicates that no self-protection notification was received in the last routine, the current routine terminates because no self-protection is provided.

If, on the other hand, the judgment result obtained in step 111 indicates that a self-protection notification was received in the last routine, processing proceeds to step 112. When processing proceeds to step 112, the booster semiconductor device 10 is in a state that prevails immediately after termination of self-protection. In other words, the control command value to be transmitted to the low-order system 22 is the first control command value after termination of self-protection. As mentioned earlier, the first control command value after termination of self-protection is generated by the excessive control inhibition section 32. In step 112, the excessive control inhibition section 32 reads the pre-start integral term stored in the storage device 33. Then, a control command value is generated (computed) by using the pre-start integral term as the integral term for the feedback term. The feedforward term and proportional term used for computing the first control command value after termination of self-protection are those which are computed by the feedforward computation section 28 and feedback computation section 30. The control command value computed in step 112 is used as the first control command value after termination of self-protection.

Figure 4:
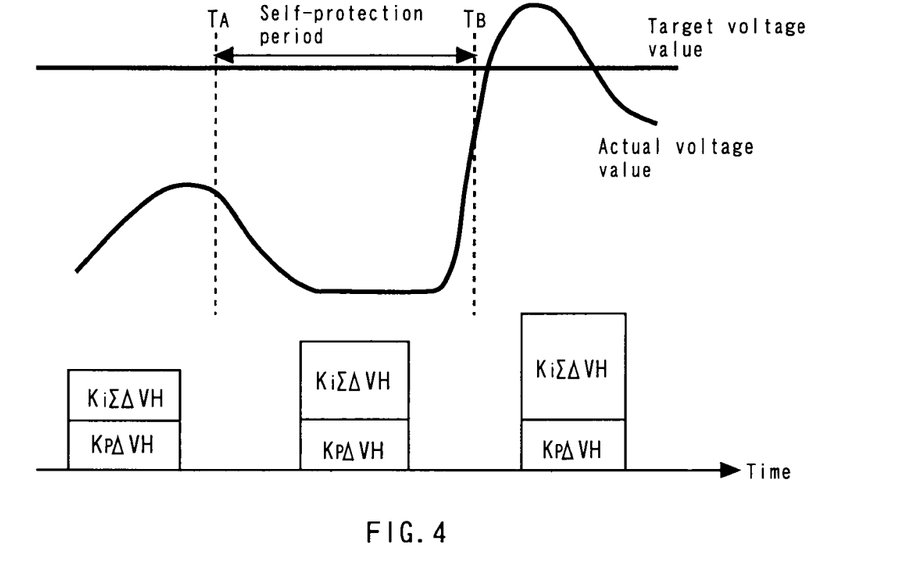
FIG. 4 shows a comparison example for the first embodiment and indicates changes in the actual voltage, target voltage, and feedback amount.

FIG. 4 shows a comparison example for the present embodiment and indicates changes in the actual voltage, target voltage, and feedback amount. The comparison example relates to a system control device that controls the low-order system, which is a booster system, in accordance with the control command value computed by the feedback computation section and feedforward computation section as is the case with a situation where no self-protection is provided even when the first control command value after termination of self-protective control is used. The configuration employed in the comparison example can provide self-protective control. It is assumed, however, that the configuration employed in the comparison example does not include the excessive control inhibition section or other component for correcting the control command value after termination of self-protection.

FIG. 4 illustrates how the actual voltage changes when the system control device shown in the comparison example provides self-protection and then ceases to provide self-protection. The target voltage and actual voltage waveforms shown in the upper half of FIG. 4 and the bar chart (feedback amount) below such waveforms are in the same form as for FIG. 2. The period between $T_A$ and $T_B$ is a self-protection period. In the present embodiment, control is not provided during the self-protection period. Therefore, there is a great discrepancy between the target voltage and actual voltage during the self-protection period. The feedback control section regards such a discrepancy as the "stationary deviation between the target voltage and actual voltage" and increases an integral value. In the comparison example, the aforementioned increased integral term is used when the first control command value after termination of self-protection ($T_B$) is to be determined. Therefore, an excessive control command value results. This causes an overshoot, in which the actual voltage greatly exceeds the target voltage, as shown in FIG. 4. As a result, the system control device may become damaged due to overvoltage application or overcurrent flow.

Figure 5:
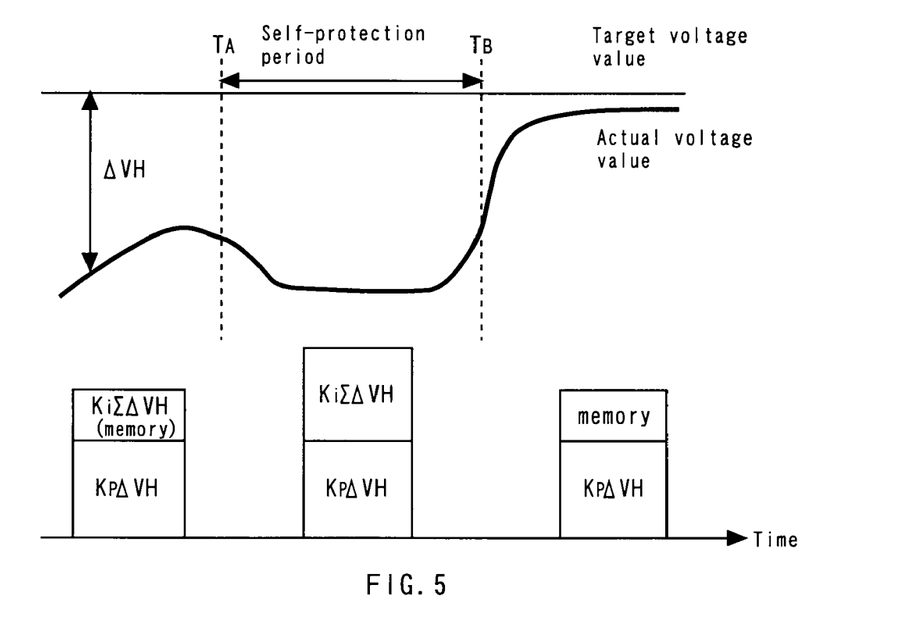
FIG. 5 shows actual voltage and target voltage waveforms and feedback amount.

The configuration according to the present embodiment solves the above problem. More specifically, the pre-start integral term stored in the storage device 33 is used to compute the first control command value after termination of self-protection. Since a control command value can be computed without using the integral term that is made excessive by self-protection, it is possible to avoid an overshoot. This is depicted in FIG. 5. FIG. 5 shows actual voltage and target voltage waveforms and feedback amount. In FIG. 5, the feedback amount prevailing after termination of a self-protection period is the sum of a memory value (the pre-start integral term stored in the storage device) and the proportional term. The integral term then takes on a value appropriate for attaining the target control value, thereby making it possible to avoid an overshoot. In addition, the pre-start integral term is an integral term prevailing at the beginning of self-protection. Therefore, it is an integral term appropriate for correcting the stationary discrepancy between the actual control value and target control value. Consequently, a control command value for accurately equalizing the actual control value with the target control value can be obtained even when it is computed immediately after termination of self-protective control.

The present embodiment assumes that the self-protective control section 11 causes the booster semiconductor device to "stop its operation for a predetermined period of time." However, the present invention is not limited to the use of the above method. The advantages of the present invention are obtained even when the self-protective control section does not refrain from exercising control during a self-protection period but continues to exercise control at an output level lower than the target control value. It is conceivable that the integral term may take on an undue value even when the above self-protection method is used. Therefore, the overshoot can be suppressed by using the pre-start integral term as the integral term for determining the first control command value after termination of self-protection.

The present embodiment assumes that the self-protection notification section "notifies during a self-protection period that self-protective control is being exercised." However, the present invention is not limited to the use of the above method. If the self-protection period is a predetermined fixed period, the self-protection notification section may notify the high-order control system 26 of only the beginning of the self-protection period. In this instance, the advantages of the present invention are obtained when the high-order control system computes the end of the self-protection period and replaces the integral term accordingly. As another alternative, the self-protection notification section may notify the high-order control system of only the beginning and end of the self-protection period. No matter which of the above two alternatives is used, it is possible to store a start integral term at the beginning of the self-protection period and replace the integral term at the end of the self-protection period. The use of the above alternatives makes it possible to obtain the advantages of the present invention and eliminates the necessity of constantly "notifying the execution of self-protective control" during the self-protection period. As a result, the number of communications between the low-order and high-order systems can be reduced.

The present embodiment assumes that the storage device included in the high-order control system stores the "pre-start integral term." However, the present invention is not limited to the use of the above method. More specifically, the storage device may store a predetermined integral term that does not cause an overshoot even when it is used after termination of self-protection (e.g., store prior to shipment a known integral term that does not cause an overshoot). As another alternative, the storage device may store not only an integral term but also a control command value for use after termination of self-protection. The use of the above alternatives makes it possible to skip the process for "extracting the pre-start integral term and storing it in the storage device," which is performed by the present embodiment. Then, the high-order system does not have to recognize the information about the beginning of the self-protection period (the period immediately after self-protection). In the above instance, the excessive control inhibition section can read the integral term stored in the storage device and calculate the first control command value after termination of self-protection as far as it grasps the end of the self-protection period.

Second Embodiment

A second embodiment of the present invention will now be described. The second embodiment relates to a system control device that corrects an integral term for a self-protection period of a booster semiconductor device and prevents the integral term from taking on an undue value. The second embodiment is configured so that an integral term lock section (not shown) is added to the configuration of the first embodiment. The integral term lock section operates so that the integral term remains unchanged during the self-protection period. The second embodiment assumes that the integral term lock section is positioned inside the feedback computation section. However, the integral term lock section may alternatively be positioned elsewhere.

Figure 6:
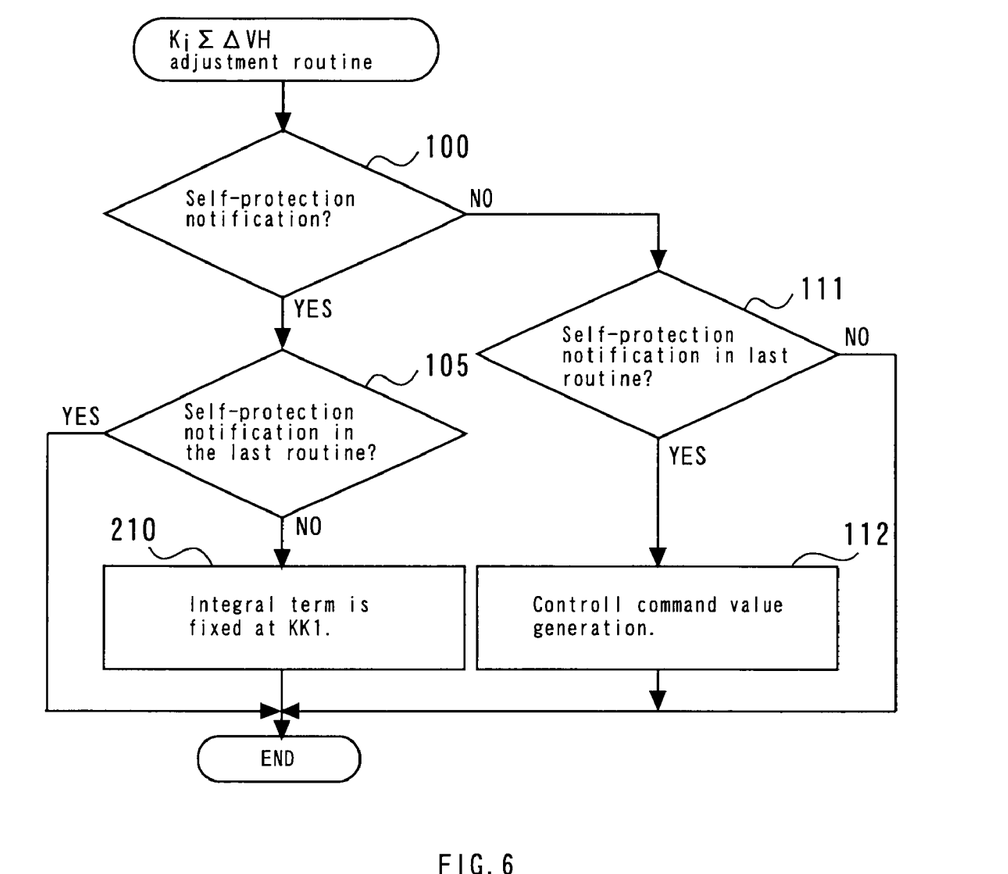
FIG. 6 is a flowchart illustrating an integral term adjustment routine according to the second embodiment.

FIG. 6 is a flowchart illustrating an integral term adjustment routine according to the present embodiment. The flowchart in FIG. 6 is similar to the flowchart in FIG. 3 except that step 110 in FIG. 3 is replaced by step 210. Therefore, only the difference between these two flowcharts will be described. As shown in FIG. 6, processing proceeds to step 210 if the judgment result obtained in step 100 indicates that a self-protection notification is received, and if the judgment result obtained in step 105 indicates that no self-protection notification was received in the last routine. In other words, step 210 is performed immediately after the provision of self-protection. In step 210, the storage device stores the pre-start integral term as is the case with the first embodiment. Simultaneously, the integral term, which is continuously computed by the feedback computation section, is fixed at a specified value KK1. The integral term is fixed at the specified value KK1 by the aforementioned integral term lock section. The integral term is fixed at the value KK1 as described above during the time interval between the instant at which step 210 is first performed and the instant at which self-protective control is terminated.

The specified value KK1 is a value predefined for the system. When the value KK1 is used as the value of the integral term, the low-order system's control value does not overshoot.

The significance of "locking the integral term during the self-protection period" in accordance with the present embodiment will now be described. The first embodiment is configured so that the first control command value after termination of self-protection does not cause an overshoot. This makes it possible to prevent the first control command value after termination of self-protection from becoming excessive. However, it takes a certain amount of processing time to execute the entire integral term adjustment routine shown in FIG. 3 in accordance with the first embodiment. It is therefore conceivable that control may resume after termination of self-protection in accordance with a control command value computed from an undue integral value before the excessive control inhibition section detects that self-protection has been just terminated. Since the first embodiment may cause the above problem, it does not completely avoid an overshoot depending on the operating status of the system control device.

Figure 7:
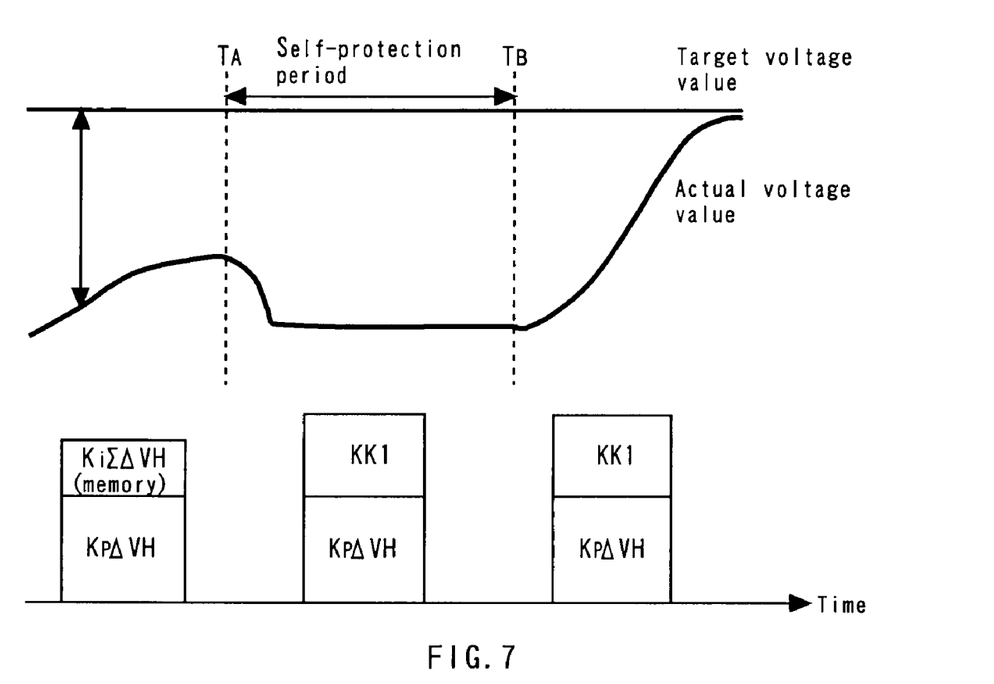
FIG. 7 depicts temporal changes in the actual value with respect to the target value.

When the configuration of the second embodiment is employed, the integral term lock section fixes the integral term at the specified value KK1 during the self-protection period. Therefore, the integral term does not become excessive during the self-protection period. Consequently, even if the first control command value after termination of self-protection is computed by the feedback computation section instead of the excessive control inhibition section, it is possible to avoid an overshoot. Changes in the actual control value provided by the configuration of the present embodiment will now be described with reference to FIG. 7. As is the case with FIG. 2, FIG. 7 depicts temporal changes in the actual control value with respect to the target control value. FIG. 7 is also similar to FIG. 2 in that a bar chart is included to depict the feedback amount. FIG. 7 indicates that no overshoot occurs even if the integral term for the self-protection period is used after the end of the self-protection period.

The present embodiment assumes that the integral term lock section is positioned in the feedback computation section. However, the integral term lock section may be positioned at any place because its position is not essential to the present invention.

The present embodiment assumes that the integral term for the self-protection period is fixed at the specified value KK1. However, the present invention is not limited to the use of the above method. The present invention is characterized by the fact that it prevents the integral term from becoming excessive during the self-protection period. Therefore, the advantages of the present invention will not be lost even when, for instance, the present invention fixes the integral term at the value 0, refrains from computing the integral term, or periodically resets the integral term instead of fixing the integral term at the specified value KK1.

Third Embodiment

A third embodiment of the present invention will now be described. The third embodiment relates to a system control device that inhibits an overshoot after termination of self-protective control without using the storage device. The third embodiment is similar in configuration to the first embodiment except as described below. The high-order control system according to the third embodiment includes a post-control integral term computation section in place of the excessive control inhibition section and storage device according to the first embodiment. The post-control integral term computation section computes the first integral term after termination of self-protective control. The post-control integral term computation section acquires the proportional term prevailing upon termination of self-protection and computes the first integral term after termination of self-protective control from the acquired proportional term. More specifically, Equation 2 below is used for computation:

Integral term computed by post-control integral term computation section=$Kp \times \Delta VH/Ki$ Equation 2

As indicated above, the first integral term after termination of self-protective control can be set to an appropriate value in accordance with the value $\Delta VH$. The configuration of the present embodiment does not require the storage device that stores, for instance, the pre-start integral term. Therefore, the present embodiment makes it possible to inhibit an overshoot after termination of self-protective control and reduce the size of the system control device.

Figure 8:
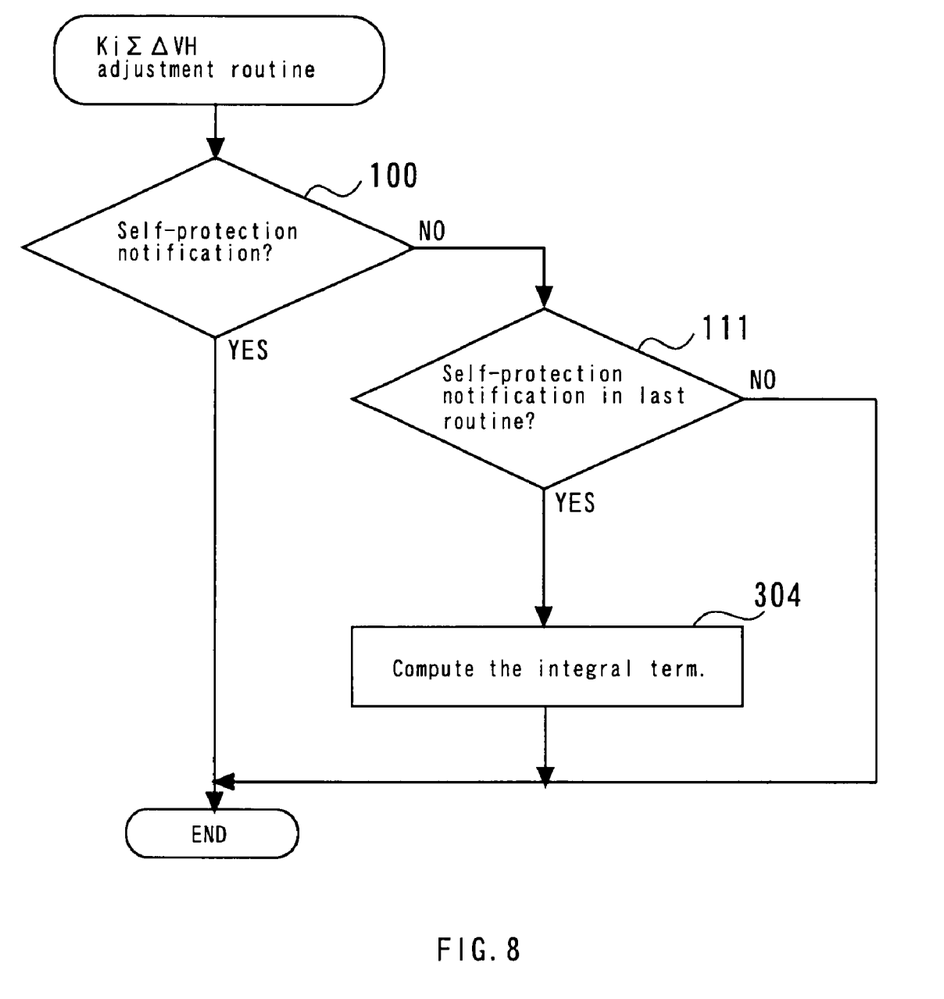
FIG. 8 is a flowchart illustrating an integral term adjustment routine that is executed by the post-control integral term computation section.

FIG. 8 is a flowchart illustrating an integral term adjustment routine that is executed by the post-control integral term computation section. First of all, step 100 is performed to judge whether a self-protection notification is received from the self-protection notification section. If the self-protection notification is received, the routine terminates because self-protective control is being exercised. If, on the other hand, no self-protection notification is detected, processing proceeds to step 111. Step 111 is performed to judge whether the self-protection notification was detected in the last routine. If the judgment result obtained in step 111 indicates that the self-protection notification was detected in the last routine, processing proceeds to step 304. In step 304, the post-control integral term computation section computes the integral term from a proportional component in accordance with Equation 2. Upon completion of step 304, the routine terminates. The integral term computed in step 304 is used as the integral term for the first control command value after termination of self-protection.

The present embodiment is characterized by the fact that the proportional term prevailing after termination of self-protective control is used to compute the integral term. Equation 2 serves as an example only. Any other equation may be alternatively used as far as it computes an appropriate integral term from the proportional term.

Fourth Embodiment

A fourth embodiment of the present invention will now be described. The fourth embodiment relates to a system control device that inhibits an overshoot after termination of self-protection by equalizing the target control value for the self-protection period with the actual control value. The present embodiment is similar in configuration to the first embodiment except as described below. The present embodiment includes a target control value change section (not shown) in place of the excessive control inhibition section and storage device according to the first embodiment. The target control value change section equalizes the target control value (target voltage value) with the actual control value. The target control value change section has wiring or communication section for receiving a self-protection notification from the self-protection notification section 21 in the low-order system 22. In addition, the target control value change section has wiring or communication section for acquiring the actual control value (the boosted voltage sensor value shown in FIG. 1).

Upon receipt of a self-protection notification, the target control value change section described above acquires an actual control value. Next, the target control value change section generates a target control value that agrees with the acquired actual control value. While self-protection is being provided, the target control value change section transmits the generated target control value to the booster semiconductor device 10 as a control command value.

When control is exercised after the control command for equalizing the target control value with the actual control value is transmitted to the booster semiconductor device 10 as described above, the value ΔVH is equal to 0. Therefore, the proportional term and integral term are both 0. This prevents the integral term for the first control command value after the end of the self-protection period from becoming excessive, thereby avoiding an overshoot.

Fifth Embodiment

Figure 11:
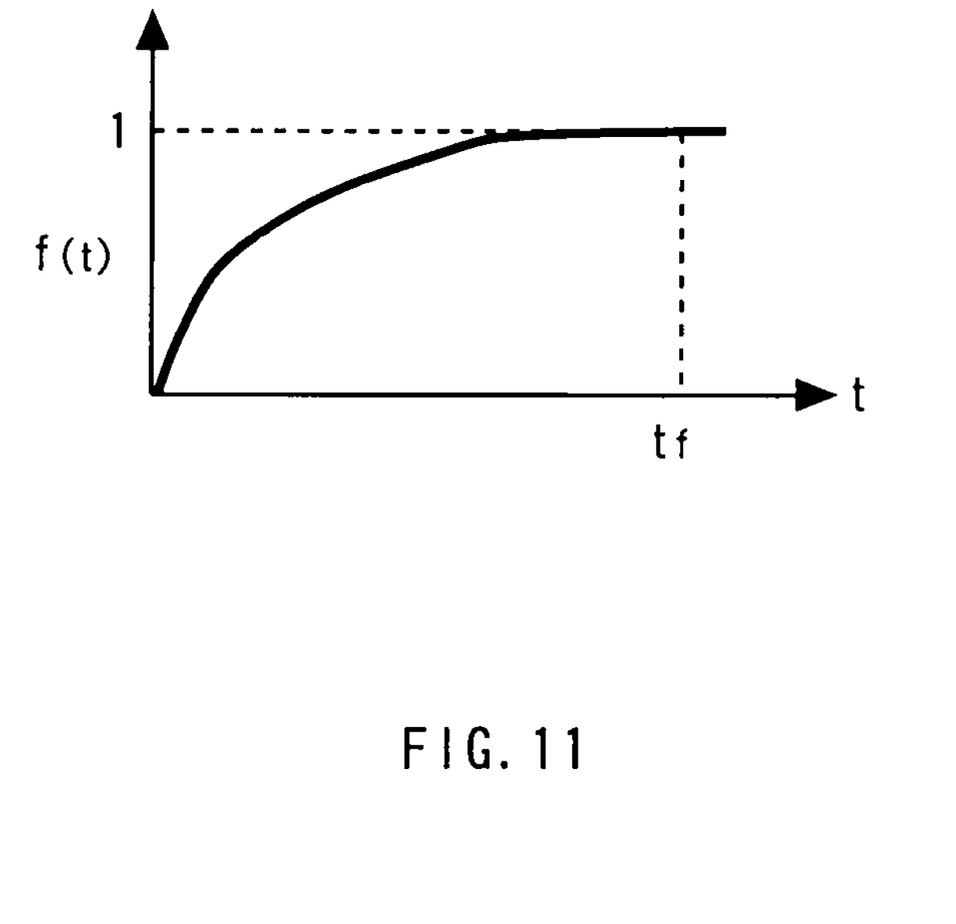
FIG. 11 shows the function $f(tco)$ changes with time.

A fifth embodiment of the present invention will now be described. The fifth embodiment relates to a system control device that decreases the target control value and inhibits the overshoot by multiplying the target control value for a predetermined period after termination of self-protection by a computation result obtained from an equation for increasing a time function from 0 to 1. The present embodiment is similar in configuration to the first embodiment except as described below. The high-order control system 26 according to the present embodiment includes a target control value conversion section (not shown) in place of the excessive control inhibition section and storage device according to the first embodiment. The target control value conversion section has wiring or communication section for receiving a self-protection notification from the self-protection notification section 21. In addition, the target control value conversion section has wiring or communication section for acquiring the actual control value (the boosted voltage sensor value shown in FIG. 1). The target control value conversion section acquires the actual control value after termination of self-protection, that is, if it receives no successive self-protection notification after the receipt of the preceding self-protection notification. The target control value conversion section then converts the target control value in accordance with Equation 3 below:

Converted target control value=actual control value+$f$(tco)×(initial target control value−actual control value)      Equation 3 where the function $f$(tco) is a time function and tco=0 when self-protective control is terminated. The initial target control value in Equation 3 is a target control value prevailing before conversion. The function $f$(tco) in Equation 3 changes with time as indicated in FIG. 11. As is obvious from FIG. 11, the function $f$(tco) is a time function that gradually increases from 0 to 1 during a predetermined period of time $t_f$. The period of time $t_f$ is determined in accordance, for instance, with the probability of overshooting after termination of self-protection. The converted target control value computed as described above is transmitted, for instance, to the feedback computation section 30. Upon receipt of the converted target control value, the feedback computation section 30 uses the converted target control value in preference to the initial target control value.

Figure 10:
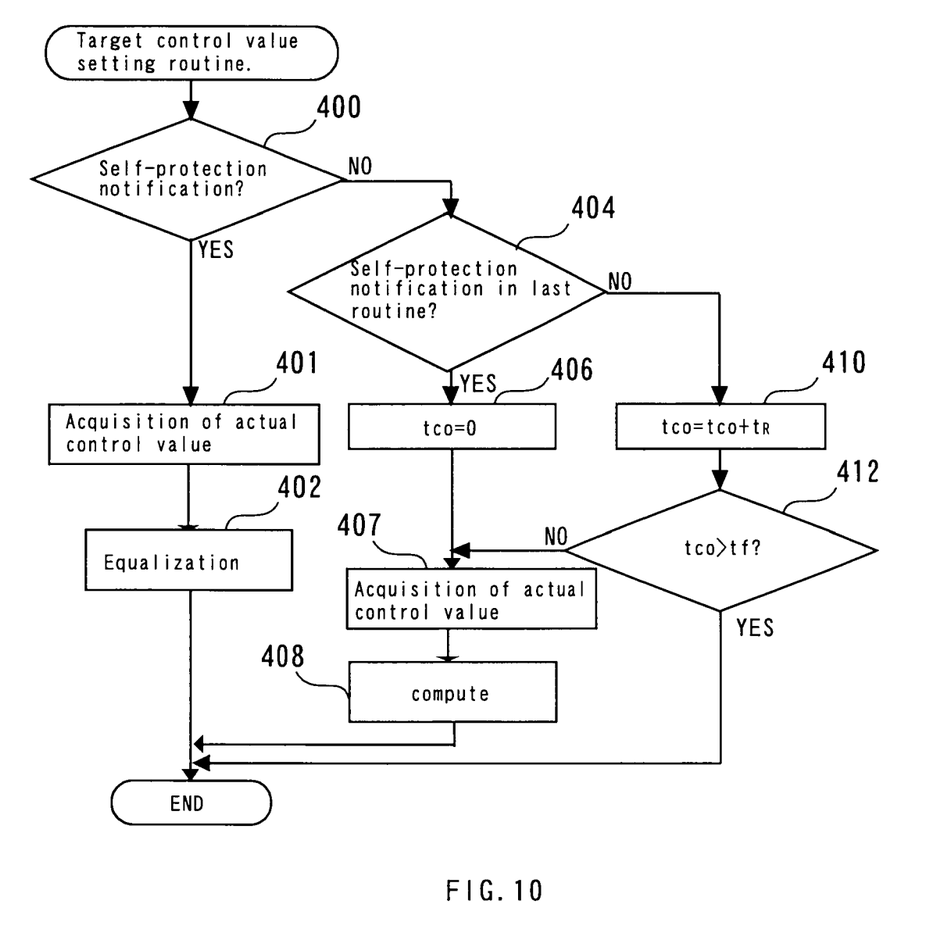
FIG. 10 is a flowchart illustrating a routine that is executed to set the converted target control value.

FIG. 10 is a flowchart illustrating a routine that is executed to set the converted target control value described above. This routine will now be described with reference to FIG. 10. First of all, step 400 is performed to judge whether a self-protection notification is received from the self-protection notification section. If the judgment result obtained in step 400 indicates that a self-protection notification is received, processing proceeds to step 401. Step 401 is performed to acquire the actual control value (the boosted voltage sensor value shown in FIG. 1). Next, processing proceeds to step 402. In step 402, the target control value is equalized with the actual control value acquired in step 401 and transmitted to the feedback computation section 30. This makes it possible to prevent the integral term for the self-protection period from taking on an excessive value.

If, on the other hand, the judgment result obtained in step 400 does not indicate that a self-protection notification is received, processing proceeds to step 404. Step 404 is performed to judge whether a self-protection notification was received in the last routine. If the judgment result obtained in step 404 indicates that a self-protection notification was received in the last routine, it means that self-protective control has just been terminated. It is then assumed that the value tco in Equation 3 is 0. Next, step 407 is performed to acquire the actual control value. Step 408 is then performed to compute the converted target control value in accordance with Equation 3.

If, on the other hand, the judgment result obtained in step 404 does not indicate that a self-protection notification was received in the last routine, processing proceeds to step 410. In step 410, an addition is performed in relation to the value tco in Equation 3. More specifically, the time $t_R$ required for executing the current routine once is added to the value tco, which was determined in the last routine. Upon completion of step 410, processing proceeds to step 412. Step 412 is performed to judge whether the value tco, which is indicated on the left-hand side of an equation shown in step 410, is greater than $t_f$. If tco>$t_f$, the current routine terminates. If, on the other hand, tco≦$t_f$, step 407 is performed to acquire the actual control value. Further, step 408 is performed to compute the converted target control value.

As described above, the converted target control value setup process according to the present embodiment is performed so as to successively compute the converted target control value as far as the value tco is not greater than the value $t_f$. The converted target control value is then used to provide feedback control.

Figure 9:
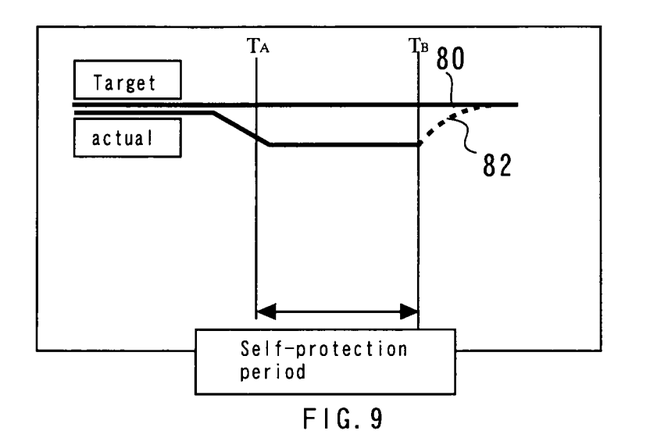
FIG. 9 depicts the actual control value, initial target control value, and converted target control value.

FIG. 9 depicts the actual control value, initial target control value, and converted target control value. In the first embodiment, the target control value remains unchanged after termination of self-protection. It is represented by the initial control value 80 in FIG. 9. In the present embodiment, however, the converted target control value based on Equation 3 is used as the control command value prevailing after termination of self-protection. The converted target control value increases gradually as indicated by a broken line 82 in FIG. 9.

According to the configuration of the present embodiment, a provisional target control value is used as the target control value for a predetermined period of time after termination of self-protective control. Therefore, the value $\Delta VH$ is small. This ensures that the feedback amount can be inhibited by feedback control for a predetermined period of time after termination of self-protective control. Consequently, it is possible to avoid an overshoot after termination of self-protective control.

In the present embodiment, steps 401 and 402 are performed to equalize the target control value with the actual control value during a self-protective control period. Therefore, the integral term does not become excessive during the self-protective control period. When this feature is exercised while using the converted target control value, it is possible to inhibit an overshoot with increased accuracy. However, the present invention is characterized by the fact that the target control value prevailing after termination of self-protective control is decreased to decrease the value $\Delta VH$. In addition, an overshoot can also be inhibited by using the converted target control value. Consequently, steps 401 and 402, which are shown in FIG. 10, are not essential to the present invention.

The present invention makes it possible to maintain the control stability of a system control device and inhibit a control value overshoot when the system control device terminates a self-protection process and resumes control based on a target control value.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2007-319793, filed on Dec. 11, 2007 including specification, claims, drawings and summary, on which the Convention priority of the present application is based, are incorporated herein by reference in its entirety.

What is claimed is:

1. A system control device comprising:
a semiconductor element;
actual control value acquisition means for acquiring the information about an actual control value of the semiconductor element;
deviation computation means for computing the deviation between the actual control value and a target control value;
integral term computation means for computing an integral term contained in a control command value;
first control command value computation means for determining a first control command value, which is the next control command value, from the immediately preceding integral term and the deviation;
first feedback control means for exercising feedback control over the semiconductor element in accordance with the first control command value;
protective control means for providing protective control by temporarily halting the semiconductor element or by exercising control at an output level lower than the target control value while allowing the first control command value computation means to perform computations during a period during which the first feedback control means exercises control;
control command value decrease means for decreasing the control command value;
termination time acquisition means for acquiring the information about the termination time for the protective control; and
termination control means which uses a control command value that is rendered smaller, by the control command value decrease means, than the first control command value computed by the first control command value computation means for the first time after the termination time, as the initial control command value after the termination time and in place of the first control command value.

2. The system control device according to claim 1,
wherein the control command value decrease means includes second control command value storage means for storing a second control command value, which is a control command value smaller than the target control value, and read means for reading the second control command value stored in the second control command value storage means; and
wherein the second control command value is used as the initial control command value after the termination time.

3. The system control device according to claim 1,
wherein the control command value decrease means includes start time acquisition means for acquiring the information about the start time for the protective control, pre-start integral term storage means for storing a pre-start integral term, which is an integral term prevailing before the start time for the protective control, and read means for reading a value stored in the pre-start integral term storage means; and
wherein the termination control means uses the pre-start integral term as an integral term for the initial control command value after the termination time.

4. The system control device according to claim 1,
wherein the control command value decrease means includes first control command value decrease means for multiplying the first control command value by a computation result obtained from an equation for increasing a time function from 0 to 1 with respect to the initial control command value after the termination time and the control command value prevailing during a predetermined period of time after the termination time; and
wherein the control command value computed according to the first control command value is used as the initial control command value after the termination time and the control command value prevailing during a predetermined period of time after the termination time.

5. A system control device comprising:
a semiconductor element;
actual control value acquisition means for acquiring the information about an actual control value of the semiconductor element;
deviation computation means for computing the deviation between the actual control value and a target control value;
integral term computation means for computing an integral term contained in a control command value;
first control command value computation means for determining a first control command value, which is the next control command value, from the integral term of the immediately preceding control command value and the deviation;

first feedback control means for exercising feedback control over the semiconductor element in accordance with the first control command value;

protective control means for providing protective control by temporarily halting the semiconductor element or by exercising control at an output level lower than the target control value while allowing the first control command value computation means to perform computations during a period during which the first feedback control means exercises control;

control command value decrease means for decreasing the control command value;

a target control value change section simulation means for equalizing the target control value with the actual control value over which the protective control is exercised; and a protected target control value change section simulation means which uses the target control value change section simulation means while the protective control is exercised.

* * * * *